US007526414B2

United States Patent
Comaniciu et al.

(10) Patent No.: US 7,526,414 B2
(45) Date of Patent: Apr. 28, 2009

(54) DENSITY MORPHING AND MODE PROPAGATION FOR BAYESIAN FILTERING

(75) Inventors: Dorin Comaniciu, Princeton Jct., NJ (US); Ying Zhu, Monmouth Junction, NJ (US); Bohyung Han, Silver Spring, MD (US)

(73) Assignee: Siemens Corporate Research, Inc., Princeton, NJ (US)

( * ) Notice: Subject to any disclaimer, the term of this patent is extended or adjusted under 35 U.S.C. 154(b) by 610 days.

(21) Appl. No.: 10/896,512

(22) Filed: Jul. 22, 2004

(65) Prior Publication Data

US 2005/0038638 A1 Feb. 17, 2005

Related U.S. Application Data

(60) Provisional application No. 60/490,326, filed on Jul. 25, 2003.

(51) Int. Cl.
*G06F 7/60* (2006.01)
*G06K 9/00* (2006.01)

(52) U.S. Cl. .......................................... 703/2; 382/103
(58) Field of Classification Search ...................... 703/2; 382/103
See application file for complete search history.

(56) References Cited

U.S. PATENT DOCUMENTS 6,981,040 B1 * 12/2005 Konig et al. ................. 709/224

| 7,128,167 | B2 * | 10/2006 | Dunlop et al. | 175/24 |
| 2003/0065409 | A1 * | 4/2003 | Raeth et al. | 700/31 |
| 2003/0068082 | A1 * | 4/2003 | Comaniciu et al. | 382/162 |
| 2003/0233197 | A1 * | 12/2003 | Padilla et al. | 702/20 |
| 2004/0081359 | A1 * | 4/2004 | Bascle et al. | 382/181 |
| 2005/0114079 | A1 * | 5/2005 | Rui et al. | 702/179 |
| 2005/0286764 | A1 * | 12/2005 | Mittal et al. | 382/181 |
| 2006/0093188 | A1 * | 5/2006 | Blake et al. | 382/103 |

* cited by examiner

*Primary Examiner*—Paul L Rodriguez
*Assistant Examiner*—Andre Pierre Louis
(74) *Attorney, Agent, or Firm*—Donald B. Paschburg; F. Chau & Associates, LLC

(57) ABSTRACT

A system and method for modeling a dynamic system using Bayesian filtering, includes a prediction module to predict a state model of the dynamic system, the prediction module generates a prediction density having at least one mode, the state model includes a conditional density function including at least one kernel. Approximating module approximates a measurement probability from a sample set through at least one kernel and an update module updates the conditional density function using the measurement probability and the prediction density. A mode finding and mixture reduction module reduces the number of kernels in the conditional density function.

29 Claims, 7 Drawing Sheets

DENSITY MORPHING AND MODE PROPAGATION FOR BAYESIAN FILTERING

CROSS-REFERENCE TO RELATED APPLICATION

This application claims the benefit of U.S. Provisional Application, "Density Morphing And Mode Propagation For Bayseian Filtering", Ser. No. 60/490,326, filed on Jul. 25, 2003, the contents of which are incorporated herein by reference.

TECHNICAL FIELD

The present invention relates to statistical signal processing and more particularly to sequential Bayesian filtering using density morphing and mode propagation.

BACKGROUND

Some areas of computational research such as real-time machine vision, speech recognition, real-time object tracking, etc., provide a complex challenge to an application designer. For example, in an object-tracking application the complexity of the system increases due to the random nature of the captured image data. For example, using machine vision to track a live person in a given environment would require complex processing of captured image data concerning the person and the environment around such person. Hence, researchers have applied probabilistic and numerical techniques to deal with complex systems with stochastic nature in the field of system dynamics and measurements.

Dynamic system tracking applications typically use estimations for determining changes in the dynamic system states over time. Dynamic states are generally modeled using discrete time approach where measurements are made available at discrete time intervals. Typically, two models—a system model, which evaluates the evolution of the system states over time and a measurement model that links noisy measurements to states—are required.

It is possible to apply several state estimation techniques using the dynamic and measurements model. One such estimation technique uses a Bayesian approach. Typical statistical methods include Kalman-Bucy filtering and Particle filtering. Kalman-Bucy filtering provides minimum-mean-squared-error state estimations only for linear stochastic systems with Gaussian initial condition on the state and Gaussian noise, For nonlinear stochastic systems or stochastic systems involving non-Gaussian random variables, particle filtering provides a numerical solution to the state estimation over time. Particle filtering is described next.

Using importance sampling, particle filtering tracks the evolution of state variable with respect to time by probability density functions (PDF) with a set of weighted samples. Several variables may be of interest in a given application. For example, in an object tracking machine vision application, the variables of interest could be the object's position, the temperature, velocity, shape, etc. For each variable, samples in the state spaces are considered to be particles, where each of them has a weight that signifies its probability. Particle filtering is used to estimate the states of such variables by recursively applying predictions and updates to the particle set.

While conventional particle filtering has become a popular technique for dynamic tracking applications, it has several drawbacks. Real-world applications typically involve nonlinear stochastic systems with a high-dimensional state space. However, particle filtering technique becomes inefficient and impractical when the dimension of the state space is high, where an inhibitively large number of samples need to be tracked. Efficient sampling in high-dimensional space is very difficult. Sample degeneracy and sample impoverishment are common issues associated with particle filtering. Hence, there is a need for a technique that provides better filtering performance by avoiding problems associated with particle filtering.

SUMMARY

A system and method for analyzing dynamic systems with linear or nonlinear dynamic models by using Bayesian filtering. The system performs prediction over a state model of the dynamic system to generate a prediction density that has one or multiple modes. The system approximates a function of a measurement probability and prediction density. An update module updates the conditional density function using the measurement probability (i.e. likelihood function) and prediction density. A mode finding and mixture reduction process reduces the number of kernels to achieve mode propagation. The system maintains, over a time span, analytic representations in the form of mixtures of kernels for prior density functions, prediction density functions, measurement likelihood function and posterior density functions.

Density morphing can be performed to track the evolution of the density function of the state distribution over time. A prediction module can be configured to apply an unscented transformation on a prior probability density function of a prior state model of the dynamic system. The update module can then generate a continuous function to approximate measurement likelihood. A density morphing module tracks density evolution over the time and reconstructs the continuous function from sparse samples. The density morphing module propagates continuous density functions over time and maintains analytic representations in the form of mixtures of kernels for representing the density functions.

The number of mixtures generated during the update as a part of the recursive prediction-update iterations can be reduced by approximating densities near the modes by using Gaussian components with predetermined bandwidths.

Further, incremental sampling and interpolation can be used to approximate the measurement likelihood and the posterior PDF. Bandwidth of the kernels can be data-driven, i.e., determined by the local density of the sample distribution. Posterior probability density function can be generated by a product of the reconstructed continuous likelihood functions and predicted density. Throughout the recursive process of filtering, the intermediate density functions can be maintained in the form of mixtures of kernels.

BRIEF DESCRIPTION OF DRAWINGS

Preferred embodiments of the invention are described with reference to the accompanying drawings, of which.

DETAILED DESCRIPTION OF PREFERRED EMBODIMENTS

Figure 1:
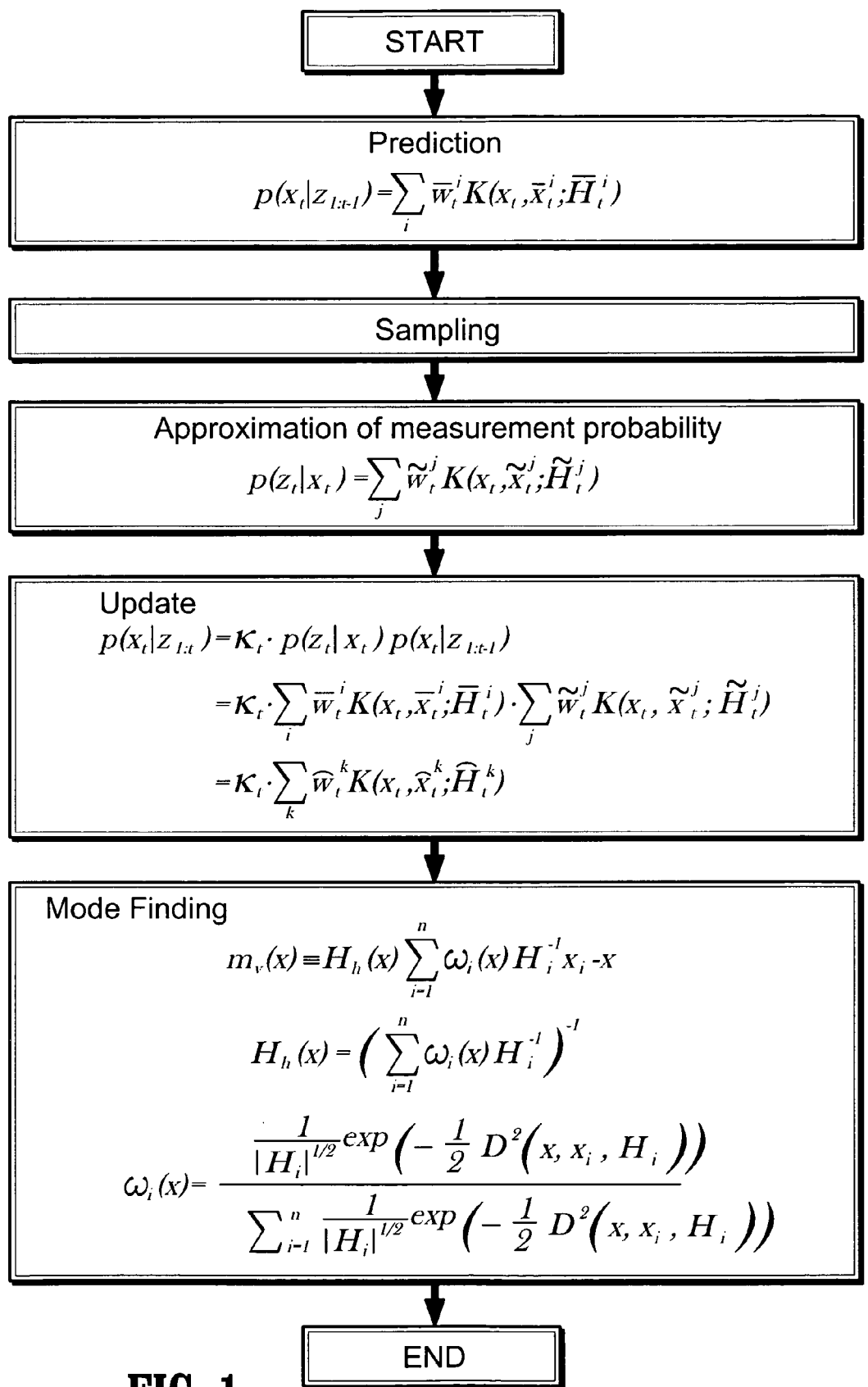
FIG. 1 is a flow-chart for a mode propagation algorithm in an embodiment of the present invention.
Figure 2A:
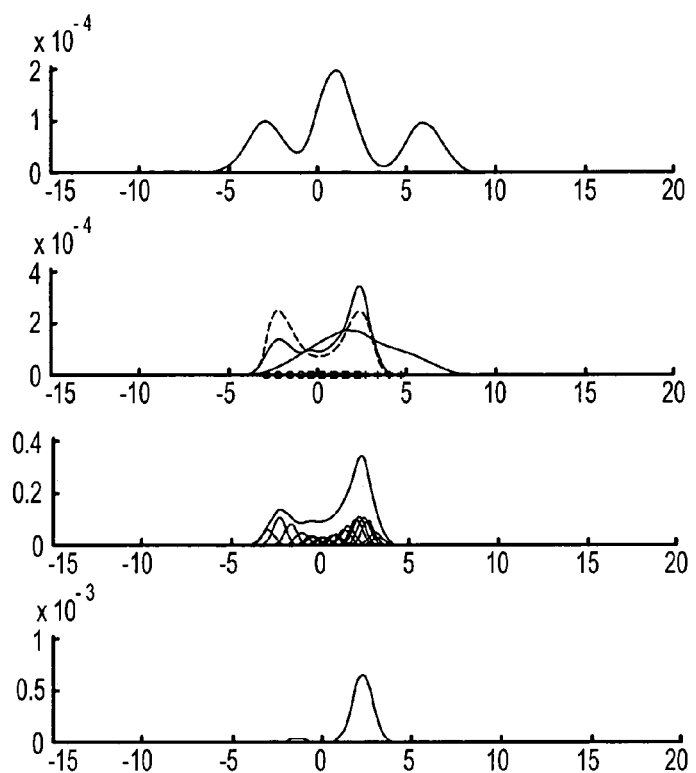
FIG. 2A is a first stage in a first simulation in an embodiment of the present invention.
Figure 2B:
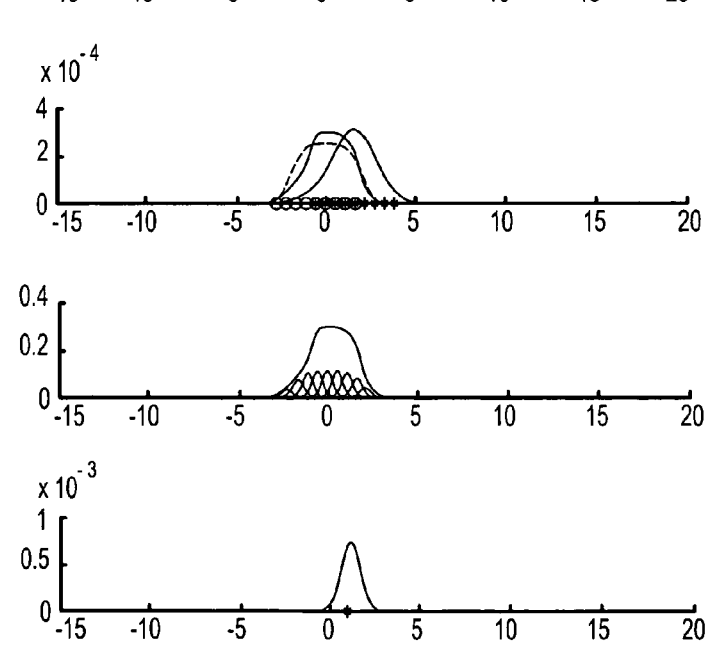
FIG. 2B is a second stage in a first simulation in an embodiment of the present invention.
Figure 2C:
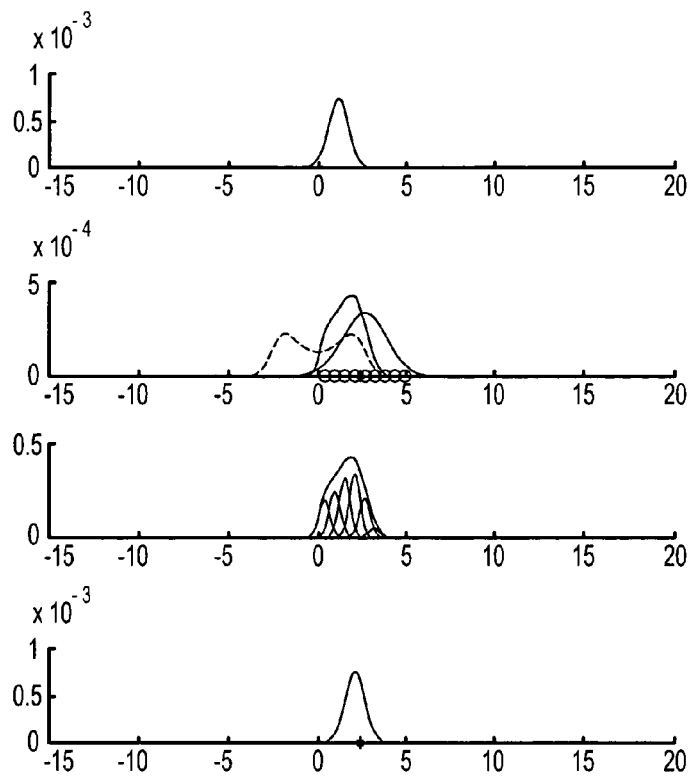
FIG. 2C is a third stage in a first simulation in an embodiment of the present invention.
Figure 2D:
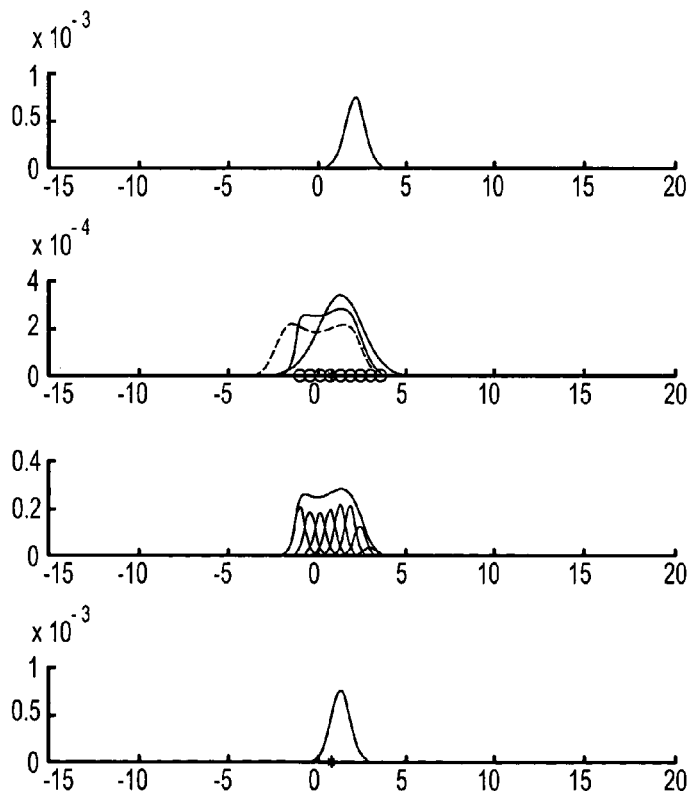
FIG. 2D is a fourth stage in a first simulation in an embodiment of the present invention.
Figure 2E:
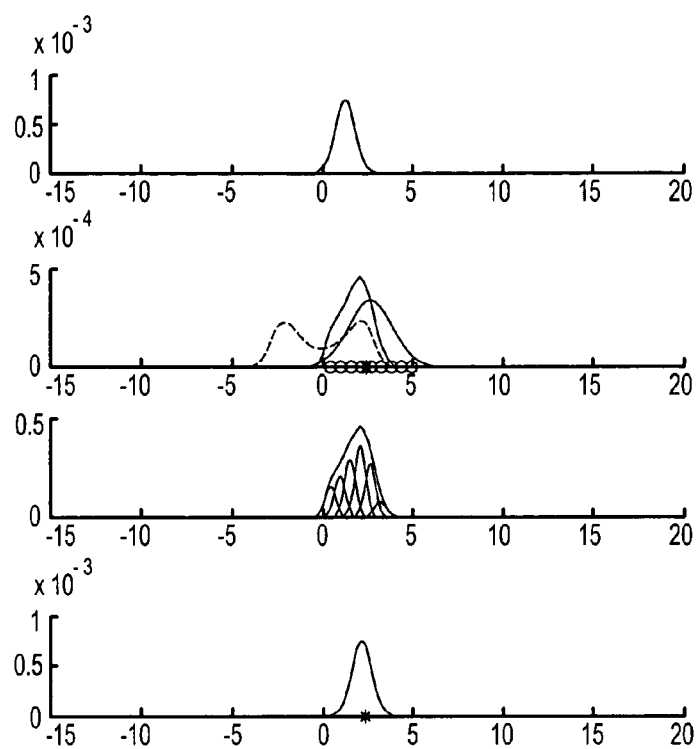
FIG. 2E is a fifth stage in a first simulation in an embodiment of the present invention.
Figure 3A:
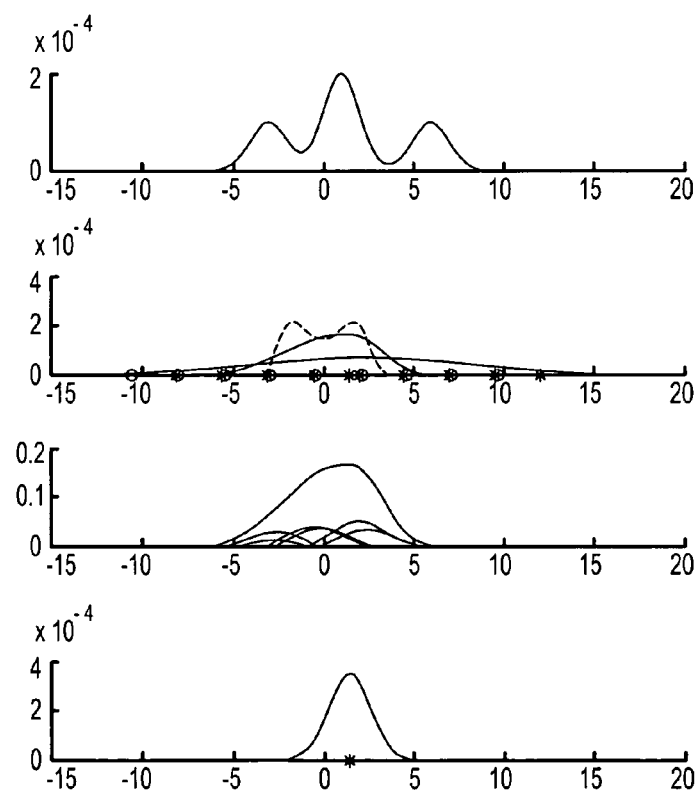
FIG. 3A is a first stage in a second simulation in an embodiment of the present invention.
Figure 3B:
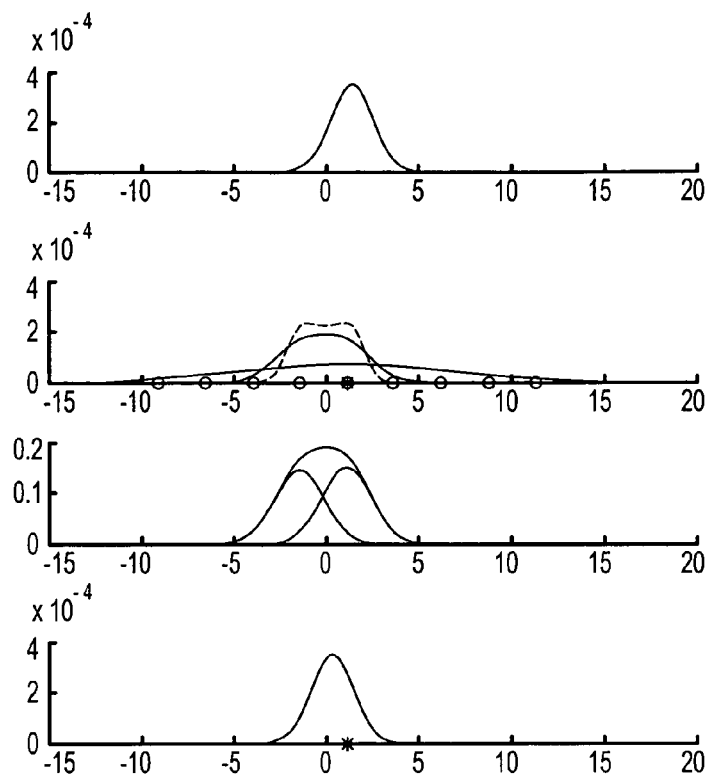
FIG. 3B is a second stage in a second simulation in an embodiment of the present invention.
Figure 3C:
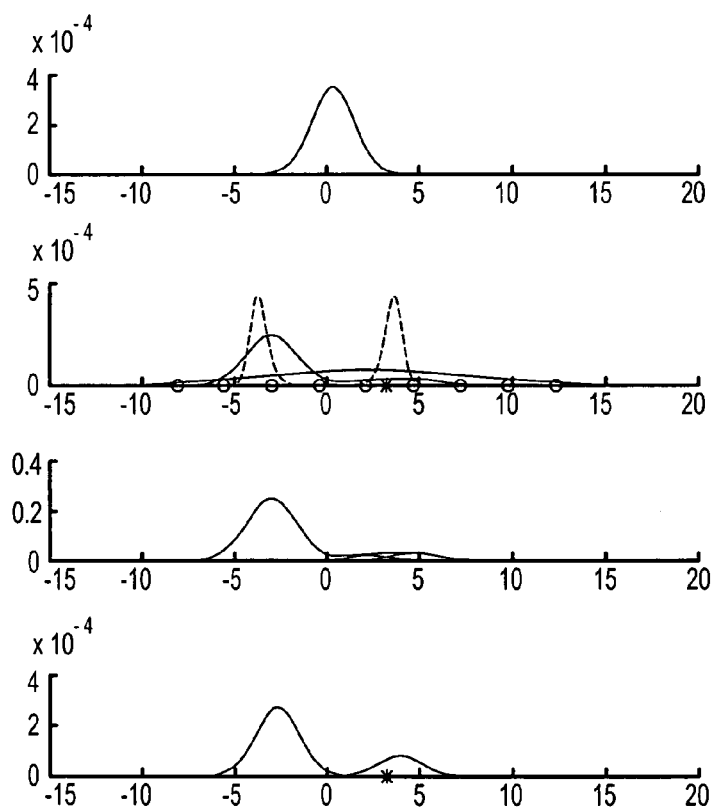
FIG. 3C is a third stage in a second simulation in an embodiment of the present invention.
Figure 3D:
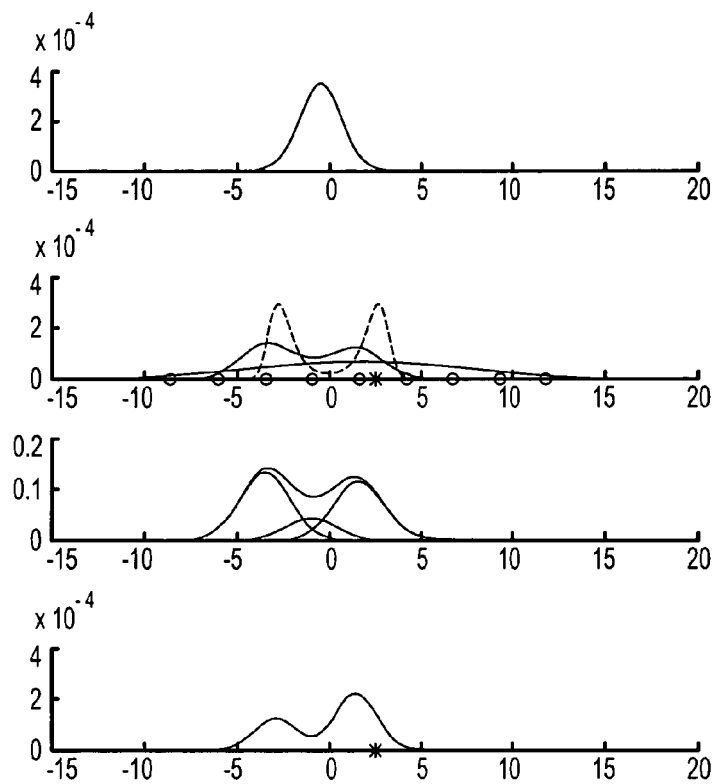
FIG. 3D is a fourth stage in a second simulation in an embodiment of the present invention.
Figure 3E:
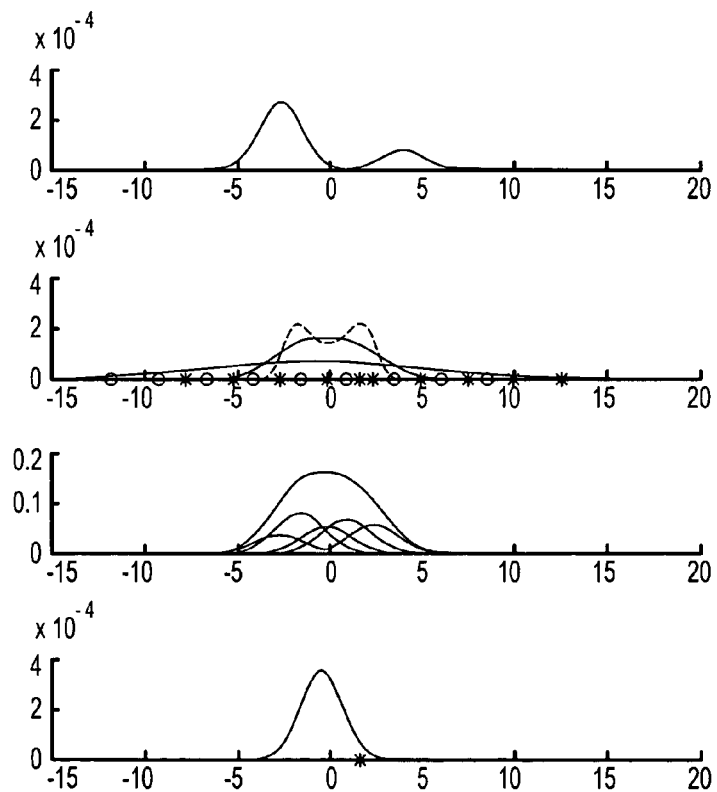
FIG. 3E is a fifth stage in a second simulation in an embodiment of the present invention.

The preferred embodiments of the present invention will be described with reference to the appended drawings.

Bayesian filtering has been used for a number of applications including computer vision. In vision applications, the object or event of interest can be modeled by a dynamic system. For example, target tracking and belief propagation are applications where Bayesian filtering has been applied extensively. In the framework of Bayesian filtering, the state variable $\{x_t; t=0, 1, 2, \ldots\}$ is characterized by its probability density function (PDF) estimated from the sequence of measurements $\{z_1, z_2, \ldots z_t\}$. The state evolution and measurement function are given by $$x_t = f_t(x_{t-1}) + v_{t-1} \quad (1)$$

$$z_t = h_t(x_t, n_t) \quad (2)$$

where $\{v_t; t=0, 1, \ldots\}$ is an Independent and Identically Distributed ("i.i.d") process noise sequence and $\{n_t; t=1, 2, \ldots\}$ is an i.i.d. measurement noise sequence. A convenient Bayesian solution to the dynamic system is given by a recursive Bayesian filter, where the conditional density of the state variable, given that the measurements are propagated through the stages of prediction and update. This process is typically performed in a recursive manner, where the measurements are processed sequentially and the posterior probability density function is constructed recursively as shown by the equations below:

$$\text{Prediction: } p(x_t|z_{1:t-1}) = \int p(x_t|x_{t-1}) p(x_{t-1}|z_{1:t-1}) dx_{t-1} \quad (3)$$

$$\text{Update: } p(x_t|z_{1:t}) = \kappa_t p(z_t|x_t) p(x_t|z_{1:t-1}) \quad (4)$$

where $z_{1:t} = \{z_1, \ldots, z_t\}$, $\kappa_t = [\int p(z_t|x_t) p(x_t|z_{1:t-1}) dx_t]^{-1}$ is a constant independent of $x_t$. In equation (3) above, $p(x_t|z_{1:t-1})$ is the prediction distribution, $p(x_t|x_{t-1})$ is the system dynamic model, also called motion model in computer vision applications, and $p(x_{t-1}|z_{1:t-1})$ is the prior distribution.

When the state equation (1) is linear and the posterior density of $x_t$ is Gaussian, the Kalman filter provides the optimal solution in terms of achieving minimum-mean-squared-error estimation. However, for many practical situations characterized by non-linear and/or non-Gaussian distributions, the solutions to optimal algorithm is not tractable due to the lack of a closed form expression for the integration result in prediction. For non-linear and/or non-Gaussian Bayesian filtering, various particle filtering methods have been developed, where the posterior density function is represented by a number of random samples (i.e. particles) $\{x_t^i; i=1, 2 \ldots\}$ and their associated weights $\{w_t^i; i=1, 2 \ldots\}$.

$$p(x_t|z_{1:t}) = \sum_i w_t^i \delta(x_t - x_t^i) \quad (5)$$

In the particle filtering technique, the conditional density is propagated through sampling, re-sampling and weight modification.

FIG. 1 is a flow-chart for a scheme called density morphing and mode propagation in an embodiment of the present invention. The main idea is to characterize the landscape of the underlying density function and track the density evolution over time. For this purpose, in at least one embodiment, the system approximates relevant probability density functions (PDFs) in the form of kernel mixtures derived by analyzing multiple modes of density functions, and maintains analytic representations throughout the recursive process of sequential Bayesian filtering. Without loss of generality, Gaussian kernels are used for presentation. The sequential filtering process is described next.

A mixture density function of the conditional density is described as:

$$p(x_t|z_{1:t}) = \sum_k w_t^k K(x_t, x_t^k; H_t^k) \quad (6)$$

where $K(x, x_t^k; H_t^k)$ is a kernel function centered at $x_t^k$, with bandwidth $H_t^k$. The Bayesian filtering through density morphing and mode propagation is described next.

In the prediction step 12, the system applies an unscented transformation to transform the prior PDF described by a mixture density function $$p(x_{t-1}|z_{1:t-1}) = \sum_{k=1}^{N_{t-1}} w_{t-1}^k K(x_{t-1}, x_{t-1}^k; H_{t-1}^k)$$

into the prediction PDF described by a mixtured density function $$p(x_t|z_{1:t-1}) = \sum_{i=1}^{N_{t-1}} \overline{w}_t^i K(x_t, \overline{x}_t^i; \overline{H}_t^i) \quad (7)$$

According equation (3), the prediction PDF is written as follows $$p(x_t|z_{1:t-1}) = \sum_{k=1}^{N_{t-1}} w_{t-1}^k \int p(x_t|x_{t-1}) K(x_{t-1}, x_{t-1}^k; H_{t-1}^k) dx_{t-1} \quad (8)$$

The computation of the prediction PDF in a nonlinear system is not straightforward due to lack of analytic solution for the integration in (8). To maintain a Gaussian mixture representation for the prediction PDF, we approximate each summation term $\int p(x_t|x_{t-1}) K(x_{t-1}, x_{t-1}^k; H_{t-1}^k) dx_{t-1}$ in (8) by a Gaussian kernel $K(x_t, \overline{x}_t^i; \overline{H}_t^i)$ through unscented transformation as follows. Every kernel $K(x_{t-1}, x_{t-1}^k; H_{t-1}^k)$ in the prior PDF is approximated by 2N+1 weighted samples, or sigma points $\{W_i, x_{t-1,i}^k\}$ $$x_{t-1,0}^k = x_{t-1}^k, \quad W_0 = \frac{\kappa}{(N+\kappa)} \quad (9)$$

$$x_{t-1,i}^k = x_{t-1}^k + \left(\sqrt{(N+\kappa)H_{t-1}^k}\right)_i, \quad W_i = \frac{1}{(N+\kappa)} \quad \text{for } i = 1, \ldots, N$$

$$x_{t-1,i}^k = x_{t-1}^k + \left(\sqrt{(N+\kappa)H_{t-1}^k}\right)_i, \quad W_i = \frac{1}{(N+\kappa)} \quad \text{for } i = N+1, \ldots, 2N$$

Where $\kappa \in R$, $(\sqrt{(N+\kappa)H_{t-1}^k})_i$ is the i-th row or column of the matrix square root of $(N+\kappa)H_{t-1}^k$, and $W_i$ is the weight associated with point $x_{t-1,i}^k$. Denote $y = f_t(x_{t-1})$ as the resulting random variable of propagating $x_{t-1}$ through a nonlinear transformation $f_t$.

The mean $\mu_y$ and covariance $H_y$ of y are calculated from the transformed sigma points as follows $$\mu_y = \sum_{i=0}^{2N} W_i f(x_{t-1,i}^k); \quad (10)$$

$$H_y = \sum_{i=0}^{2N} W_i [f_t(x_{t-1,i}^k) - \mu_y][f_t(x_{t-1,i}^k) - \mu_y]^T$$

The mean and covariance of y obtained by the unscented transformation are precise to the second order of the Taylor series expansion of any nonlinear function $f_t$. The choice of parameter $\kappa$ affects the error introduced by higher order moments. Applying the unscented transformation to the Gaussian components of $K(x_{t-1}, x_{t-1}^k; H_{t-1}^k)$ in (8) according to (3), the approximation of the prediction PDF (7) is derived as follows:

$$p(x_t \mid z_{1:t-1}) = \sum_{k=1}^{N_t} \bar{w}_t^k K(x_t, \bar{x}_t^k; \bar{H}_t^k) \quad (11)$$

$$\bar{N}_t = N_{t-1}; \quad \bar{w}_t^k = w_{t-1}^k$$

$$\bar{x}_t^k = \sum_{i=0}^{2N} W_i f(x_{t-1,i}^k);$$

$$\bar{H}_t^k = \sum_{i=0}^{2N} W_i [f(x_{t-1,i}^k) - \bar{x}_t^k][f(x_{t-1,i}^k) - \bar{x}_t^k]^T + Q_t$$

where $Q_t$ is the variance of process noise $v_t$. It should be noted that here random sampling strategy can also be employed.

At step 14, the predicted density (7) is used to draw a set of samples $\{\tilde{x}_t^j\}$. The likelihood of the measurement is $p(z_t \mid \tilde{x}_t^j)$ calculated at these sample points.

At step 16, the likelihood function $p(z_t \mid x_t)$ of the measurement is approximated as kernel mixtures. The approximation is obtained by interpolating the likelihood function from samples $\{\tilde{x}_t^j\}$, assuming that the measurement likelihood is reasonably smooth.

$$p(z_t \mid x_t) = \sum_j \tilde{w}_t^j K(x_t, \tilde{x}_t^j; \tilde{H}_t^j) \quad (12)$$

An outline of the approximation process can be stated as:

1. Analytic sampling; place samples in sparsely sampled area and area of significance (high measurement probability); discovery and refinement.
2. Interpolation; data-responsive variable bandwidth; and weight adjustment.

The density morphing and mode reduction algorithm progressively improves the approximation of the likelihood through incremental sampling. In contrast to various improved particle filters, a continuous approximation of the likelihood function is interpolated from all the samples available from each sampling step.

Sampling and distribution update is repeated over multiple steps. At each step, new samples are drawn from the approximate likelihood function recovered in the previous step. New samples are then added into the sample set which is used to obtain a new approximation of the distribution.

Given a set of samples, the likelihood or posterior distribution is approximated by a mixture function composed of weighted Gaussian kernels whose centers are set as sample locations and whose bandwidths are determined by the distance to their k-th nearest neighbors (kNN), which reflects the local density condition of the actual sample distribution.

The kernel bandwidths are data driven and lead from a smooth to fine interpolation of the underlying distribution function. In the initial step, with a small number of samples that are sparsely distributed in the state space, kernel bandwidths are set large and the interpolation algorithm gives a smooth approximation of the distribution.

As the sample size increases, samples are distributed densely, which leads to small kernel bandwidths, and the interpolation result reveals fine details of the landscape of the underlying distribution function. Since the analytic representation provides a global view of the landscape of the likelihood function, efficient sampling is possible, More samples should be placed in the region where the likelihood has significant values. The algorithm is summarized as follows with prediction distribution used as the initial sampling function.

1. Choose the prediction PDF as the initial sampling function $p_1(x) = p(x_t \mid z_{1:t-1})$.
2. For $i = 1, \ldots, n$:
   Draw m samples $\{x_{i,1}, \ldots, x_{i,m}\}$ from the sampling function $p_i(x)$, and calculate the measurement likelihood at these points $f(x_{i,j}) = p(z_t \mid x_t = x_{i,j})$ $(j = 1, \ldots, m)$
   Interpolate the likelihood function from all available samples and their likelihood values $\{(x_{k,j}, f(x_{k,j})\}$ $(k = 1, \ldots, i; j = 1, \ldots, m)$ $$\tilde{f}_i(x) = \sum_{k=1,\ldots,i; j=1,\ldots,m} w_{k,j} K(x; x_{k,j}, H_{k,j}) \quad (13)$$

$$H_{k,j} = \lambda \cdot d_{k_0}(x_{k,j}) \quad (14)$$

where $\lambda$ is a constant, and $d_{k_0}(x)$ is the Euclidean distance between x and its k-th nearest neighbor in the sample set. The weights are solved by the non-negative lease square (NNLS) algorithm.

$$\{w_{k,j}\}_{k=1,i;j=1,\ldots,m} = \arg\min \sum_{x \in \{x_{k,j}\}} \|\tilde{f}_i(x) - \sum_{k=1,\ldots,i;j=1,\ldots,m} w_{k,j} K(x; x_{k,j}, H_{k,j})\|^2 \quad (15)$$

Update the sampling function $$p_{i+1}(x) = \kappa \cdot \tilde{f}_i(x) \quad (16)$$

where $\kappa = \tilde{f}_i(x)/\int \tilde{f}_i(x)dx$ is a constant for normalization.

3. The posterior PDF is approximated by the final interpolation result $\tilde{f}_n(x)$ and is written as a mixture function (12).

It is well known that closer the sampling function is to the distribution function under estimation, the better density estimate can be obtained from samples. It has been shown that, to recover a distribution function of interest, the best choice of the sampling function, which minimizes the variance of distribution estimate, is determined by the unknown distribution itself. Therefore, optimal sampling is not available in many situations.

Previous approaches choose to use the prediction PDF as the sampling function to estimate the measurement likelihood, which could lead to severe sample degeneracy when the likelihood is very "peaky" as compared to the sampling function. In the density morphing and mode propagation approach, sampling and updating of the sampling function simultaneously is done simultaneously through incremental sampling. The advantage is to bring the sampling function close to the distribution under estimation, so that the resulting density estimate is less sensitive to the initial sampling function.

At step 18, an update on the posterior PDF is performed. With the prediction density (7) and the measurement likelihood (12), the conditional density function is updated as $$p(x_t | z_{1:t}) = \kappa_t \cdot p(z_t | x_t) p(x_t | z_{1:t-1}) \quad (17)$$

$$= \kappa_t \cdot \sum_i \overline{w}_t^i K(x_t \cdot \overline{x}_t^i; \overline{H}_t^i) \cdot \sum_i \tilde{w}_t^j K(x_t, \tilde{x}_t^j; \tilde{H}_t^j)$$

$$= \kappa_t \cdot \sum_k \overline{w}_t^k K(x_t; \overline{x}_t^k; \overline{H}_t^k)$$

where $\kappa_t = \lfloor \int p(z_t|x_t) p(x_t|z_{1:t-1}) dx_t \rfloor$ is a constant independent of $x_t$. Due to the mixture representation of (7) and (12), the conditional density $p(x_t|z_{1:t})$ can be represented by a mixture density function with increased number of kernels.

If the prediction PDF $p(x_t|z_{1:t-1})$ and the measurement likelihood $p(z_t|x_t)$ are each represented by a Gaussian mixture with $N_1$ and $N_2$ components respectively, the resulting posterior PDF $p(x_t|z_{1:t})$ has $N=N_1 N_2$ components. This number could explode in recursive filtering. Therefore, an algorithm or a technique is needed to reduce the mixture size. The need for approximating the sum or the product of Gaussian mixtures also arises in several other contexts, including nonparametric belief propagation and training mixture models.

A given application may bypass the approximating measurement likelihood, and use the incremental sampling and interpolation method to directly reconstruct a mixture representation for the product of the prediction PDF and the measurement likelihood. By normalizing the product, one obtains a kernel mixture representation of the posterior PDF.

At step 20, a mode finding and mixture reduction procedure is performed. To maintain a reasonable number of kernels in the posterior PDF, a mode finding and mixture reduction procedure through variable-bandwidth mean-shift is applied to reduce the number of mixtures in (17). The main idea is to locate the main modes of the posterior PDF and derive a more concise representation with fewer kernels using the modes to approximate the original density function. Mixture reduction is now described in detail. Given a Gaussian mixture resulting from the sum or the product of several Gaussian mixtures, $$f(x) = \sum_{i=1}^N a_i K(x; x_i, H_i) \quad (18)$$

where $$K(x; x_i, H_i) = (2\pi)^{-\frac{d}{2}} |H_i|^{-\frac{1}{2}} \exp\left(-\frac{1}{2}(x-x_i)^T H_i^{-1}(x-x_i)\right)$$

one can treat $f(x)$ as a density estimate from sample population $\{x_i\}$ with variable bandwidth $\{H_i\}$. A new algorithm called mode reduction produces an approximation of the original density, with a reduced number of Gaussian components. The algorithm is founded by the Variable Bandwidth MeanShift theory and performs a mode finding procedure on kernel density estimates.

From (18), one can compute the gradient as well as the Hessian at x $$\text{gradient: } \nabla f(x) = \sum_{i=1}^N a_i K(x; x_i, H_i) H_i^{-1}(x_i - x) \quad (19)$$

$$\text{Hessian: } (\nabla \nabla^T) f(x) =$$

$$\sum_{i=1}^N a_i K(x; x_i, H_i) H_i^{-1} [(x-x_i)(x-x_i)^T - H_i] H_i^{-1}$$

Starting from x, the variable bandwidth MeanShift produces a convergent sequence:

$$y_{j+1} = \left(\sum_{i=0}^N \omega_i(y_i) H_i^{-1}\right)^{-1} \sum_{i=1}^N \omega_i(y_j) H_i^{-1} x_i \quad (20)$$

$$y_0 = x; \ j = 1, 2, \ldots, \text{ till convergence}$$

$$\text{where } \omega_i(x) = \frac{a_i K(x; x_i, H_i)}{\sum_{i=1}^N a_i K(x; x_i, H_i)}$$

At the convergence location $$y_m = (\Sigma_{i=1}^N w_i(y_m) H_i^{-1}) \Sigma_{i=1}^N w_i(y_m) H_i^{-1} x_i, \text{ we have}$$
$$\nabla f(x)|x=y_m = 0.$$

To verify that this is indeed a mode, one needs to verify that the Hessian is negative definite $(\nabla\nabla^T)f(x)|x=y_m < 0$. By starting from each $x_i$ and running the Variable bandwidth Mean- Shift procedure, we can locate all the modes of $f(x)$. In addition, we divide all the samples $\{x_i\}$ into disjoint sets $\{x_{j,i}\}$ such that samples in the same set $\{x_{j,1},x_{j,2},\ldots\}$ converge to the same mode $m_j$. The idea of our algorithm is to approximate the density near the modes using Gaussian components with proper bandwidth. For a Gaussian component $k(x;\mu_j,\Sigma_j)$, the gradient and the Hessian computed at the mean $\mu_j$, also being the mode, are:

$$\nabla K\left(x;\mu_j,\sum_j\right)\Big|_{x=\mu_j} = 0 \qquad (21)$$

$$(\nabla\nabla^T)K(x)|_{x=\mu_j} = -(2\pi)^{\frac{1-d}{2}}|\Sigma_j|^{\frac{-1}{2}}\Sigma_j^{-1}$$

To approximate the density near the mode, we equate the location, gradient and Hessian of the Gaussian component with the parameters computed at a mode $m_j$.

$$\mu_j = m_j$$

$$\nabla K(x;\mu_j,\Sigma_j)|x=\mu_j = \nabla f(x)|x=m_j$$

$$(\nabla\nabla^T)K(x;\mu_j,\Sigma_j)|x=\mu_j = (\nabla\nabla^T)f(x)|x=m_j$$

Following (21), the Gaussian kernel is decided by:

$$\mu_j = m_j \qquad (23)$$

$$\Sigma_j = |2\pi(-P)^{-1}|^{-\frac{1}{d+2}}(-P^{-1}) \text{ where } P = (\nabla\nabla^T)f(x)|_{x=m_j}$$

given that the Hessian P is negative definite. For those samples $x_j$ whose convergence point is not a mode of $f(x)$, we maintain the Gaussian component $k(x;x_j,H_j)$ in the reduced mixture approximation. The resulting approximation is expressed as:

$$\tilde{f}(x) = \sum_{j=1}^{M} c_j K(x;m_j,\Sigma_j) \qquad (24)$$

$$\sum_{j=1}^{M} c_j = 1, M < N$$

$(m_j,\Sigma_j)=(m_j,(\nabla\nabla^T)f(x)|x=m_j)$ or $(x_{j_i},H_{j_i})$ depending on whether $x_{j_i}$ is associated with mode $m_j$. The integrated square error of the approximation can be evaluated.

$$\|\tilde{f}(x)-f(x)\|^2 = c^T Q c + q^T b + F \qquad (25)$$

where $c=[c_1,\ldots,c_M]^T$ is the weight vector, Q is a M×M matrix, $$Q = \begin{bmatrix} \langle K(x;m_1,\Sigma_1), K(x;m_1,\Sigma_1)dx & \ldots & \langle K(x;m_1,\Sigma_1), K(x;m_M,\Sigma_1)\rangle \\ & \ldots & \\ \langle K(x;m_M,\Sigma_1), K(x;m_1,\Sigma_1)\rangle & \ldots & \langle K(x;m_M,\Sigma_1), K(x;m_M,\Sigma_1)\rangle \end{bmatrix} \qquad (26)$$

and q is a M×1 vector, $q=-2[<K(x;m_1,f(x)>,\ldots,<K(x;m_M,f(x)f(x)>]^T$.

The notation $<f(x), g(x)>=\int f(x)g(x)dx$ is used.

The weights of the new components are obtained by solving the following convex quadratic programming problem:

$$c = \underset{\bar{c}}{\operatorname{argmin}} \bar{c}^T Q b + q^T \bar{c} \qquad (27)$$

$$\text{subject to } \sum_{i=1}^{M} c_i = 1$$

$$c_i \geq 0 \text{ for } i=1,\ldots,M$$

In general, the means $\{m_j\}$ and the bandwidths $\{\Sigma_j\}$ of the new components are up to further optimization over the cost function (25).

After mode finding and mixture reduction, the conditional density is estimated by a reduced number of kernels.

$$p(x_t|z_{1:t}) = \sum_k w_t^k K(x_t \cdot x_t^k; H_t^k) \qquad (28)$$

Density morphing and Mode propagation have several potential advantages over the conventional particle filtering. Through the Variable-bandwidth Mean-shift based mode finding algorithm, the number of modes in the posterior is determined automatically and naturally. This information helps to decide the number of samples to be drawn. With the conventional particle filtering methods, it is difficult to determine how to efficiently sample the state space, especially when the dimensions are high.

The optimal bandwidth can also be determined by imposing certain smoothness of the measurement probability and the posterior. Thus, optimal sampling given the kernel density and estimation constraints are achieved. Optimal sampling is especially critical when the dimension of the state space is high, which is often encountered in real applications. In mode propagation, kernel estimation is used to replace particles, and with variable bandwidth it is able to reduce the effects of degeneracy and sample impoverishment.

Experimental results for the above are presented below. The nonlinear process model and the non-stationary observation model used in the experiments are:

$$x_{t+1}=1+\sin(w\pi t)+\phi x_t+v_t$$

$$z_t=\phi x_t^2+n_t$$

where $v_t$ is i.i.d., Gaussian noise with zero mean and variance $n_v^2$, $v_t \sim N(0,n_v^2)$, $w=4e-2$ and $\phi=0.5$ are scalar parameters. The observation noise $n_t$ is drawn from a Gaussian distribution $N(0,1^2)$. In the initial step, a Gaussian mixture distribution describes the state variable.

To approximate the measurement distribution, a system based on at least one embodiment of the present invention samples the mean and a number of sigma points from each Gaussian in the predicted state distribution. Assuming that the predicted state distribution has a mixture of N Gaussians denoted as $N(m_i, \sigma_i^2) i=1, \ldots, n$. m samples are drawn from the prediction distribution. Sample weights are proportional to the measurement probability. Then the measurement distribution is composed of m Gaussian mixture, and—nm Gaussian kernels are used to estimate the posterior distribution in the final step. The mode-fusion procedure based on the Variable-bandwidth Mean-shift algorithm is applied to simplify the state description with a reduced number of Gaussians.

FIGS. 2A-2E and 3A-3E are plots of simulations/experiments carried out using at least one embodiment of the present invention. The figures show that during the filtering process, multi-modal states are propagated over time. With proper scale selection, the approximation of the measurement probability function is very close to the ground truth, and the true state variables are being tracked.

In the experiments described next, nine points are sampled from each Gaussian, and we set $k=\sqrt{2}/3$. The FIGS. 2A-2E and 3A-3E show the procedure of this algorithm for two cases: small prediction error with $n_v^2=1$ (FIG. 2A-2E) and large prediction error $n_v^2=5$ (FIGS. 3A-3E). The first row of each figure shows the conditional density from the last step. The second row shows the predicted distribution (solid line), true measurement (dashed line), sampled points (solid line and circles) and estimated measurement (dotted line). In the third row, dashed lines are Gaussian kernels generated from sampled points and the dotted line is the summation of those kernels. The last row shows the posterior distribution with true position specified with the asterisk/star symbol.

It is to be understood that the present invention may be implemented in various forms of hardware, software, firmware, special purpose processors, or a combination thereof. In at least one embodiment, the present invention may be implemented in software as an application program tangibly embodied on a program storage device. The application program may be uploaded to, and executed by, a machine capable of computing and having any suitable architecture.

Figure 4:
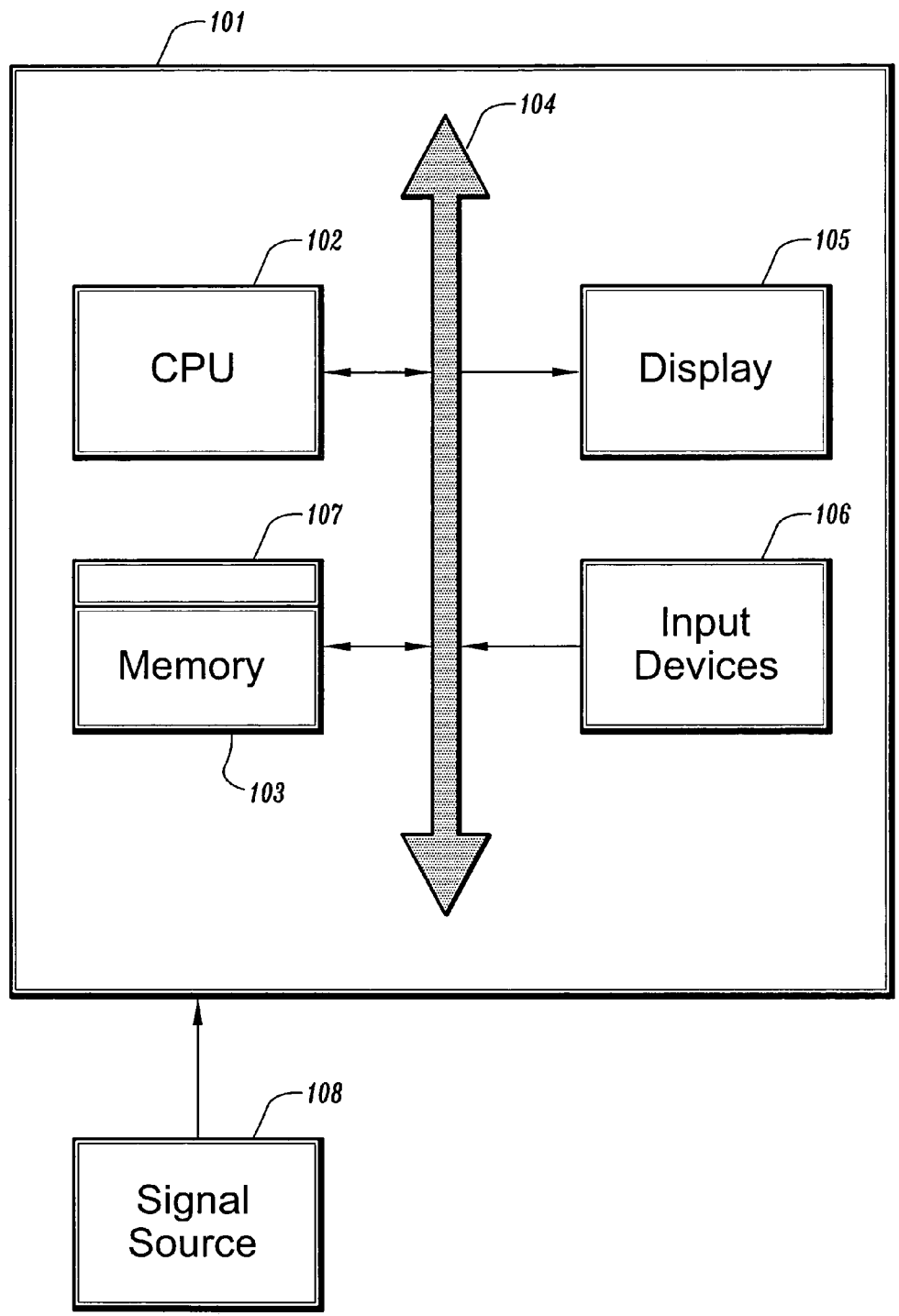
FIG. 4 is an exemplary computer system used in an embodiment of the present invention.

Referring to FIG. 4, according to an embodiment of the present invention, a computer system 101 for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The Bayesian filtering method based on mode propagation can be generally applied to any purpose object tracking. For example, to 3D human tracking, vehicle tracking, and tracking problems from a large range of applications and domains. Software modules can be built for prediction, sampling, approximation and update as described above in detail. Additionally, input and output devices or other modules can be included depending upon a given application. Those skilled in the art will appreciate that these are only examples of applications where Bayesian filtering based on mode propagation can be applied.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for tracking an object within a dynamic image, comprising:

receiving a first image including the object;

generating a posterior probability density function representing the location of the object within the first image;

automatically detecting information pertaining to the modes of the posterior probability density function and using the detected information pertaining to the modes to determine a number of sets of Gaussian components with which to approximate a predicted probability density function representing the location of the object within a subsequent image;

evolving the modes of the posterior probability density function from a previous measurement frame into a set of modes of the posterior probability density function of a current measurement frame, wherein evolving the modes of the posterior probability density function including the steps of:

detecting information pertaining to modes of the predicted probability density function;

detecting information pertaining to modes of a likelihood function of the current measurement frame; and detecting information pertaining to the modes of the posterior probability density function of the current measurement frame using the information of the modes of the predicted probability density function and the information of the modes of the likelihood function;

generating an analytic expression for the predicted probability density function based on the evolved set of modes of the posterior probability density function using the determined number of sets of Gaussian components; and using the generated analytic expression of the predicted probability density function to track the location of the object within the subsequent image.

2. The method of claim 1, wherein the modes of the predicted probability density function represent corresponding kernels of the modes of the posterior probability density function.

3. The method of claim 1, wherein the modes of the predicted probability density function are randomly selected.

4. The method of claim 1, wherein the modes of the predicted probability density function are selected according to bandwidth information of the modes of the posterior probability density function.

5. The method of claim 1, wherein the analytic expression for the predicted probability density function is a mixture of kernels.

6. The method of claim 5, wherein the kernels are Gaussian functions.

7. The method of claim 1, wherein the first image and the subsequent image are each frames of the dynamic image.

8. A system for tracking an object within a dynamic image, comprising:
an image receiving unit for receiving a first image including the object;
a posterior probability density function generating unit for generating a posterior probability density function representing the location of the object within the first image;
a detecting unit for automatically detecting information pertaining to the modes of the posterior probability density function and using the detected information pertaining to the modes to determine a number of sets of Gaussian components with which to approximate a predicted probability density function representing the location of the object within a subsequent image;
an evolving unit for evolving the modes of the posterior probability density function from a previous measurement frame into a set of modes of the posterior probability density function of a current measurement frame, wherein evolving the modes of the posterior probability density function includes: detecting information pertaining to modes of the predicted probability density function; detecting information pertaining to modes of a likelihood function of the current measurement frame; and detecting information pertaining to the modes of the posterior probability density function of the current measurement frame using the information of the modes of the predicted probability density function and the information of the modes of the likelihood function;
a predicted probability density generating function unit for generating an analytic expression for the predicted probability density function based on the evolved set of modes of the posterior probability density function using the determined number of sets of Gaussian components; and
a tracking unit using the generated analytic expression of the predicted probability density function to track the location of the object within the subsequent image.

9. The system of claim 8, wherein the modes of the predicted probability density function represent corresponding kernels of the modes of the posterior probability density function.

10. The system of claim 8, wherein the modes of the predicted probability density function are randomly selected.

11. The system of claim 8, wherein the modes of the predicted probability density function are selected according to bandwidth information of the modes of the posterior probability density function.

12. The system of claim 8, wherein the analytic expression for the predicted probability density function is a mixture of kernels.

13. The system of claim 12, wherein the kernels are Gaussian functions.

14. The system of claim 8, wherein the first image and the subsequent image are each frames of the dynamic image.

15. A program storage device readable by a machine, tangibly embodying a program of instructions executable by the machine to perform method steps for tracking an object within a dynamic image, the method comprising:
receiving a first image including the object;
generating a posterior probability density function representing the location of the object within the first image;
automatically detecting information pertaining to the modes of the posterior probability density function and using the detected information pertaining to the modes to determine a number of sets of Gaussian components with which to approximate a predicted probability density function representing the location of the object within a subsequent image;
evolving the modes of the posterior probability density function from a previous measurement frame into a set of modes of the posterior probability density function of a current measurement frame, wherein evolving the modes of the posterior probability density function including the steps of:
detecting information pertaining to modes of the predicted probability density function;
detecting information pertaining to modes of a likelihood function of the current measurement frame; and
detecting information pertaining to the modes of the posterior probability density function of the current measurement frame using the information of the modes of the predicted probability density function and the information of the modes of the likelihood function;
generating an analytic expression for the predicted probability density function based on the evolved set of modes of the posterior probability density function using the determined number of sets of Gaussian components; and
using the generated analytic expression of the predicted probability density function to track the location of the object within the subsequent image.

16. The program storage device of claim 15, wherein the modes of the predicted probability density function represent corresponding kernels of the modes of the posterior probability density function.

17. The program storage device of claim 15, wherein the modes of the predicted probability density function are randomly selected.

18. The program storage device of claim 15, wherein the modes of the predicted probability density function are selected according to bandwidth information of the modes of the posterior probability density function.

19. The program storage device of claim 15, wherein the analytic expression for the predicted probability density function is a mixture of kernels.

20. The program storage device of claim 19, wherein the kernels are Gaussian functions.

21. The program storage device of claim 15, wherein the first image and the subsequent image are each frames of the dynamic image.

22. A method for tracking an object within a dynamic image, comprising:

receiving a first image including the object;

generating a posterior probability density function representing the location of the object within the first image;

automatically detecting information pertaining to the modes of the posterior probability density function and using the detected information pertaining to the modes to determine a number of sets of Gaussian components with which to approximate a predicted probability density function representing the location of the object within a subsequent image;

evolving the modes of the posterior probability density function from a previous measurement frame into a set of modes of the posterior probability density function of a current measurement frame by performing mode analysis on the modes of the predicted probability density function;

generating an analytic expression for the predicted probability density function based on the evolved set of modes of the posterior probability density function using the determined number of sets of Gaussian components; and using the generated analytic expression of the predicted probability density function to track the location of the object within the subsequent image.

23. The method of claim 22, wherein performing mode analysis on the modes of the predicted probability density function includes:

detecting information pertaining to modes of the predicted probability density function;

detecting information pertaining to modes of a likelihood function of the current measurement frame; and detecting information pertaining to the modes of the posterior probability density function of the current measurement frame using the information of the modes of the predicted probability density function and the information of the modes of the likelihood function.

24. The method of claim 23, wherein the modes of the predicted probability density function represent corresponding kernels of the modes of the posterior probability density function.

25. The method of claim 23, wherein the modes of the predicted probability density function are randomly selected.

26. The method of claim 23, wherein the modes of the predicted probability density function are selected according to bandwidth information of the modes of the posterior probability density function.

27. The method of claim 23, wherein the analytic expression for the predicted probability density function is a mixture of kernels.

28. The method of claim 27, wherein the kernels are Gaussian functions.

29. The method of claim 23, wherein the first image and the subsequent image are each frames of the dynamic image.

* * * * *